United States Patent
Kwon et al.

(10) Patent No.: US 9,954,707 B2
(45) Date of Patent: Apr. 24, 2018

(54) METHOD AND DEVICES FOR REDUCING PEAK TO AVERAGE POWER RATIO

(71) Applicant: SOLiD, INC., Seongnam-si, Gyeonggi-do (KR)

(72) Inventors: Nagwon Kwon, Seoul (KR); Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/391,183

(22) Filed: Dec. 27, 2016

(65) Prior Publication Data

US 2017/0187561 A1 Jun. 29, 2017

(30) Foreign Application Priority Data

Dec. 28, 2015 (KR) .................. 10-2015-0187859

(51) Int. Cl.
*H04B 7/15* (2006.01)
*H04L 27/26* (2006.01)
*H04W 52/36* (2009.01)

(52) U.S. Cl.
CPC ........... *H04L 27/2623* (2013.01); *H04B 7/15* (2013.01); *H04L 27/2624* (2013.01); *H04W 52/36* (2013.01)

(58) Field of Classification Search
CPC ......... H04L 274/26; H04B 7/15; H04W 52/36
See application file for complete search history.

(56) References Cited

U.S. PATENT DOCUMENTS

| | | | |
|---|---|---|---|
| 2002/0197970 A1* | 12/2002 | Jian | H04B 1/707 455/245.2 |
| 2013/0022148 A1* | 1/2013 | Sagi | H04L 27/361 375/296 |
| 2014/0341316 A1* | 11/2014 | Yu | H04L 27/2624 375/296 |

* cited by examiner

*Primary Examiner* — Jaison Joseph
(74) *Attorney, Agent, or Firm* — Sughrue Mion, PLLC

(57) ABSTRACT

According to an aspect of the inventive concept, there is provided a crest factor reduction (CFR) core, including: a clipper clipping an input signal; a delay unit delaying the input signal; a first subtractor subtracting the clipped input signal from the delayed input signal; an error shaping filter filtering the subtracted signal for shaping an error which occurs by the clipping of the input signal; a digital filter filtering the input signal for cancelling noise of the input signal; and a second subtractor subtracting the filtered subtracted signal from the filtered input signal.

10 Claims, 3 Drawing Sheets

METHOD AND DEVICES FOR REDUCING PEAK TO AVERAGE POWER RATIO

CROSS REFERENCE TO RELATED APPLICATION

This application claims priority from Korean Patent Application No. 10-2015-0187859, filed on Dec. 28, 2015, in the Korean Intellectual Property Office, the contents of which is incorporated herein by reference in its entirety.

BACKGROUND

1. Field

The inventive concept relates to a method and devices for reducing a peak to average power ratio (PAPR), and more particularly, to a method and devices for reducing peak to average power ratio (PAPR), which are used for increasing power efficiency of a repeater.

2. Description of Related Art

A repeater is an electronic device that receives a signal from at least one base station and retransmits the signal at a higher level or with higher power.

The signal used in the repeater often has a high peak to average power ratio (PAPR). This limits efficiency of a power amplifier implemented in the repeater. Therefore, various PAPR reducing methods are proposed in order to increase the efficiency of the power amplifier included in the repeater.

Crest factor reduction (CFR) is one of the methods. However, the CFR technique has a problem in terms of increasing a delay time of the repeater.

SUMMARY

The inventive concept is directed to provide a method and devices for reducing a peak to average power ratio (PAPR) for minimizing a delay time of a repeater while reducing the PAPR.

Additional aspects will be set forth in part in the description which follows and, in part, will be apparent from the description, or may be learned by practice of the presented embodiments.

According to an aspect of the inventive concept, there is provided a crest factor reduction (CFR) core, including: a clipper clipping an input signal; a delay unit delaying the input signal; a first subtractor subtracting the clipped input signal from the delayed input signal; an error shaping filter filtering the subtracted signal for shaping an error which occurs by the clipping of the input signal; a digital filter filtering the input signal for cancelling noise of the input signal; and a second subtractor subtracting the filtered subtracted signal from the filtered input signal.

According to an exemplary embodiment, a time required for filtering the input signal may be substantially equivalent to an aggregation time of a time required for delaying the input signal, a time required for subtracting the clipped input signal from the delayed input signal, and a time required for filtering the subtracted signal.

According to an exemplary embodiment, the error shaping filter may be a finite impulse response (FIR) filter.

According to an exemplary embodiment, the digital filter may be the finite impulse response (FIR) filter.

According to another aspect of the inventive concept, there is provided a repeater including: a first antenna receiving a first analog signal; an analog to digital converter (ADC) converting the first analog signal into a first digital signal; a CFR core receiving the first digital signal and outputting the received first digital signal as a second digital signal having a reduced PAPR; a digital to analog converter (DAC) converting the second digital signal into a second analog signal; and a second antenna transmitting the second analog signal, wherein the CFR core includes a clipper clipping the first digital signal; a delay unit delaying the first digital signal; a first subtractor subtracting the clipped first digital signal from the delayed first digital signal; an error shaping filter filtering the subtracted signal for shaping an error which occurs by the clipping of the first digital signal; a digital filter filtering the first digital signal for cancelling noise of the first digital signal; and a second subtractor subtracting the filtered subtracted signal from the filtered first digital signal.

According to an exemplary embodiment, a time required for filtering the first digital signal may be substantially equivalent to an aggregation time of a time required for delaying the first digital signal, a time required for subtracting the clipped first digital signal from the first digital signal, and a time required for filtering the subtracted signal.

According to an exemplary embodiment, the error shaping filter may be a finite impulse response (FIR) filter.

According to still another aspect of the inventive concept, there is provided a method for reducing a PAPR, including: clipping an input signal; delaying the input signal; subtracting the clipped input signal from the delayed input signal; filtering the subtracted signal for shaping an error which occurs by the clipping of the input signal; filtering the input signal for cancelling noise of the input signal; and subtracting the filtered subtracted signal from the filtered input signal.

According to an exemplary embodiment, a time required for filtering the input signal may be substantially equivalent to an aggregation time of a time required for delaying the input signal, a time required for subtracting the clipped input signal from the delayed input signal, and a time required for filtering the subtracted signal.

According to an exemplary embodiment, a level of the clipped input signal may be a threshold value or less.

According to exemplary embodiments of the inventive concept, a method and devices for reducing a peak to average power ratio (PAPR) can minimize a delay time of a repeater while reducing the PAPR by using a digital filter instead of a delay unit.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
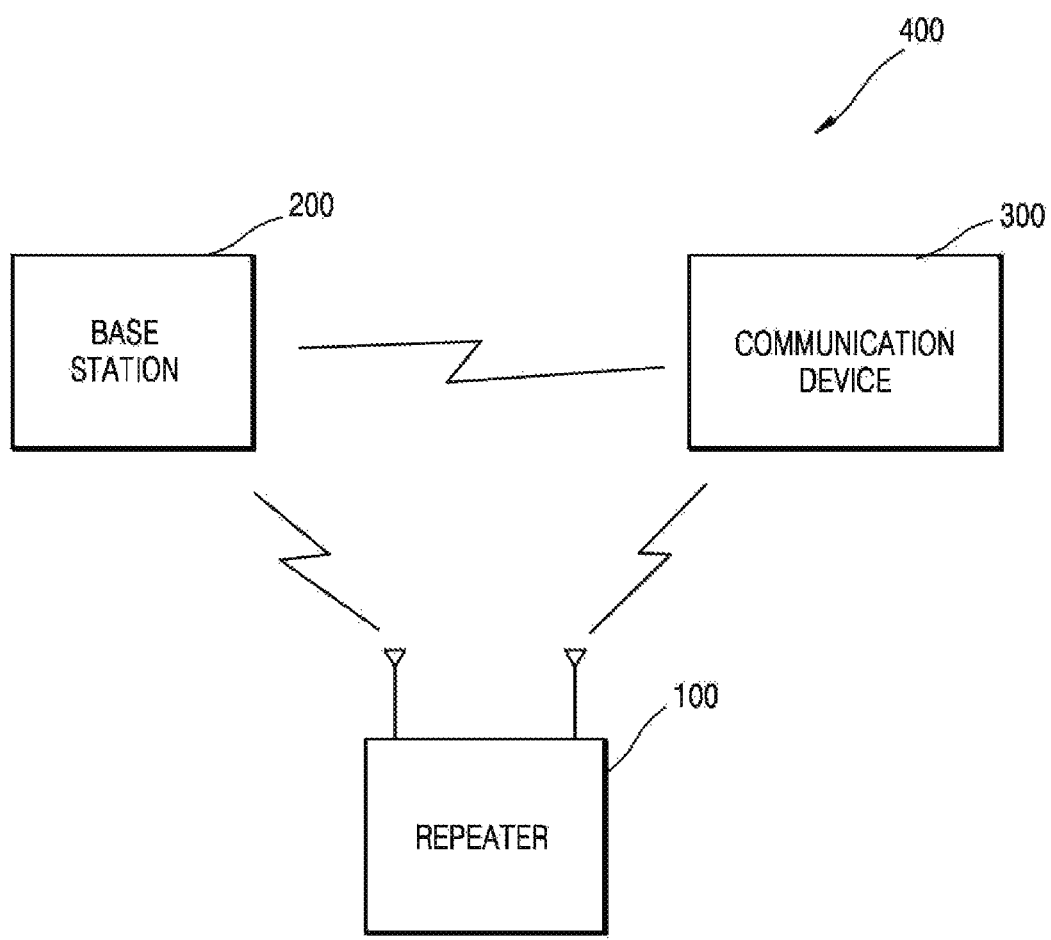
FIG. 1 is a block diagram of a wireless communication system according to an exemplary embodiment of the inventive concept.

The inventive concept may be variously modified and have various exemplary embodiments, so that specific embodiments will be illustrated in the drawings and described in the detailed description. However, this does not limit the inventive concept to specific exemplary embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element. Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a microprocessor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to be clarified that distinguishing components in the specification just distinguishing the components for each primary function which each component takes charge of. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course. Hereinafter, exemplary embodiments of the inventive concept will be sequentially described in detail.

FIG. 1 is a block diagram of a wireless communication system according to an exemplary embodiment of the inventive concept.

Referring to FIG. 1, the wireless communication system 400 may include a frequency division duplexing (FDD) network, a frequency division multiple access (FDMA) network, a code division multiple access (CDMA) network, a time division multiple access (TDMA) network, a direct sequence spread spectrum (DSSS) network, a frequency hopping spread spectrum (FHSS) network, or any other wireless communication network. In some exemplary embodiments, the wireless communication system 400 may be configured to operate as a second generation (2G) wireless communication network, a third generation (3G) wireless communication network, a fourth generation (4G) wireless communication network, a long term evolution (LTE) wireless communication network, or a next generation wireless communication network, for example, 5G and the like.

The wireless communication system 400 may include a repeater 100, a base station 200, and a communication device 300.

The base station 200 and the communication device 300 may transmit and receive a signal to and from each other. The communication device 300 is an electronic device in which wireless communication is available, such as a cellular phone, a smart phone, or a tablet PC. When the signal between the base station 200 and the communication device 300 is not sufficient to enable voice or data communication, the repeater 100 may be used.

The repeater 100 receives a signal output from the base station 200 to retransmit the signal to the communication device 300 at a higher level or with higher power. According to the exemplary embodiment, the repeater 100 may be called as a wireless repeater.

Figure 2:
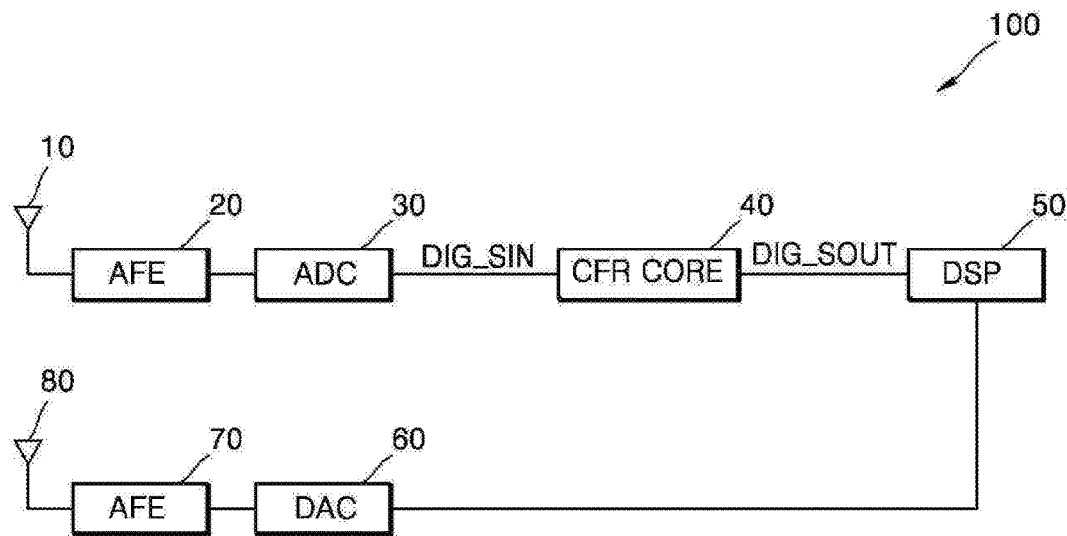
FIG. 2 is a block diagram of a repeater illustrated in FIG. 1.

FIG. 2 is a block diagram of a repeater illustrated in FIG. 1. Referring to FIGS. 1 and 2, the repeater 100 may include a first antenna 10, an analog front end (AFE) 20, an analog to digital converter (ADC) 30, a crest factor reduction (CFR) core 40, a digital signal processor (DSP) 50, a digital to analog converter (DAC) 60, a second AFE 70, and a second antenna 80. According to the exemplary embodiment, the repeater 100 may be variously implemented by using other components.

The first antenna 10 receives the signal output from the base station 200. According to the exemplary embodiment, the first antenna 10 may transmit a signal received from the communication device 300 to the base station 200. The second antenna 80 transmits the signal to the communication device 300. According to the exemplary embodiment, the second antenna 80 may receive a signal from the communication device 300. According to the exemplary embodiment, the repeater 100 may include at least one duplexer (not illustrated) for each of antennas 10 and 80.

A plurality of AFEs 20 and 70 is a set of analog components for performing a receiving function and a transmitting function. Each of the plurality of AFEs 20 and 70 may include a variable gain amplifier (VGA) (not illustrated), a power amplifier (PA) (not illustrated), a filter (not illustrated), a mixer (not illustrated), or a driver (not illustrated). The AFE 20 processes an analog signal received through the first antenna 10 by using the component such as the filter in order to perform the receiving function and outputs the processed analog signal.

The ADC 30 converts the processed analog signal into a digital signal DIG_SIN. The digital signal DIG_SIN has a high PAPR. The CFR core 40 is used to reduce the PAPR. The CFR core 40 receives the digital signal DIG_SIN to output the received digital signal DIG_SIN as a digital signal DIG_SOUT having a reduced PAPR. An input signal DIG_SIN of the CFR core 40 has a higher PAPR than an output signal DIG_SOUT of the CFR core 40. A detailed operation of the CFR core 40 will be described in FIG. 3. The CFR core 40 may be implemented as one chip. According to the exemplary embodiment, the CFR core 40 may be implemented as a part of the DSP 50. Further, according to the exemplary embodiment, the CFR core 40 may be variously called like a CFR processor.

The DSP 50 executes commands for performing various operations required for processing the digital signal. The various operations may mean an operation such as measurement, filtering, or compression of the signal.

The DAC 60 converts the digital signal processed by the DSP 50 into the analog signal.

The AFE 70 processes the analog signal by using a component such as the PA. The second antenna 80 transmits the analog signal processed by the AFE 70.

Figure 3:
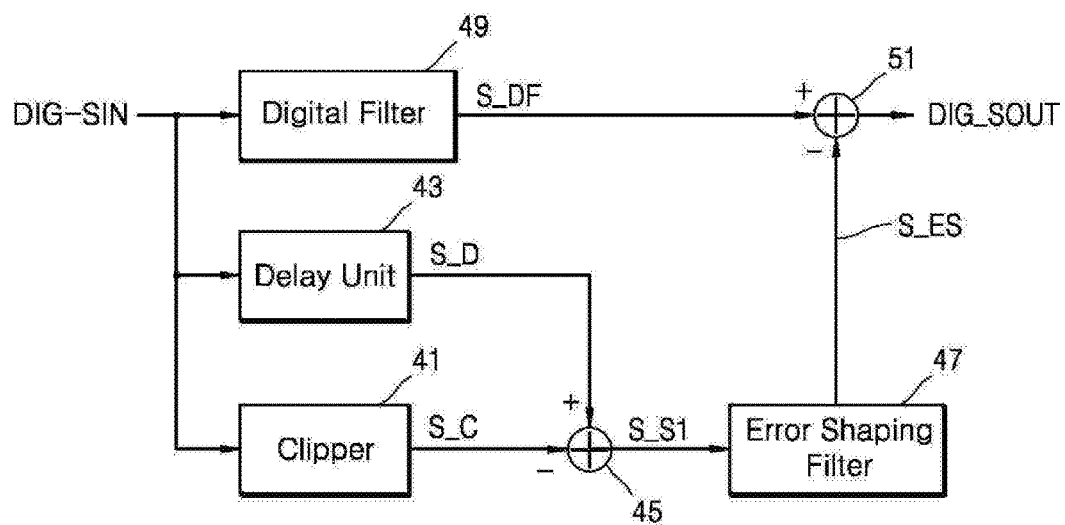
FIG. 3 is a block diagram of a crest factor reduction (CFR) core illustrated in FIG. 2.

FIG. 3 is a block diagram of a crest factor reduction (CFR) core illustrated in FIG. 2.

Referring to FIGS. 1 to 3, the crest factor reduction (CFR) core 40 includes a clipper 41, a delay unit 43, a first subtractor 45, an error shaping filter 47, a digital filter 49, and a second subtractor 51.

The clipper 41 receives the digital signal DIG_SIN output from the ADC 30. The digital signal DIG_SIN has a high PAPR. The clipper 41 clips the digital signal DIG_SIN by using a threshold value. In detail, a level of the clipped digital signal S_C is the threshold value or more.

The delay unit 43 receives the digital signal DIG_SIN output from the ADC 30. The delay unit 43 delays the digital signal DIG_SIN.

The first subtractor 45 subtracts the clipped digital signal S_C from the delayed digital signal S_D. A level of a signal S_S1 subtracted by the first subtractor 45 is the threshold value or less.

The error shaping filter 47 is used for shaping an error which occurs by the clipper 41. The error shaping filter 47 filters the subtracted signal S_S1. The error shaping filter 47 may be a finite impulse response (FIR) filter.

The digital filter 49 filters the digital signal DIG_SIN for cancelling noise of the digital signal DIG_SIN output from the ADC 30. Herein, the noise may include at least one channel (or frequency band) which is unwanted to transmit to the communication device 300. Therefore, the digital filter 49 may selectively output at least one specific channel (or frequency band) included in the digital signal DIG_SIN. A time required for filtering the digital signal DIG_SIN by the digital filter 49 is substantially equivalent to an aggregation time of a time required for delaying the digital signal DIG_SIN by the delay unit, a time required for subtracting the clipped digital signal S_C from the delayed digital signal S_D by the first subtractor 45, and a time required for filtering the subtracted signal S_S1 by the error shaping filter 47. The digital filter 49 may be the finite impulse response (FIR) filter.

The second subtractor 51 subtracts a signal S_ES output from the error shaping filter 47 from a digital signal S_DF filtered by the digital filter 49.

The digital signal DIG_SOUT output by the second subtractor 51 is output to the DSP 50 in order to perform various operations required for the DSP 50 to process the digital signal.

Figure 4:
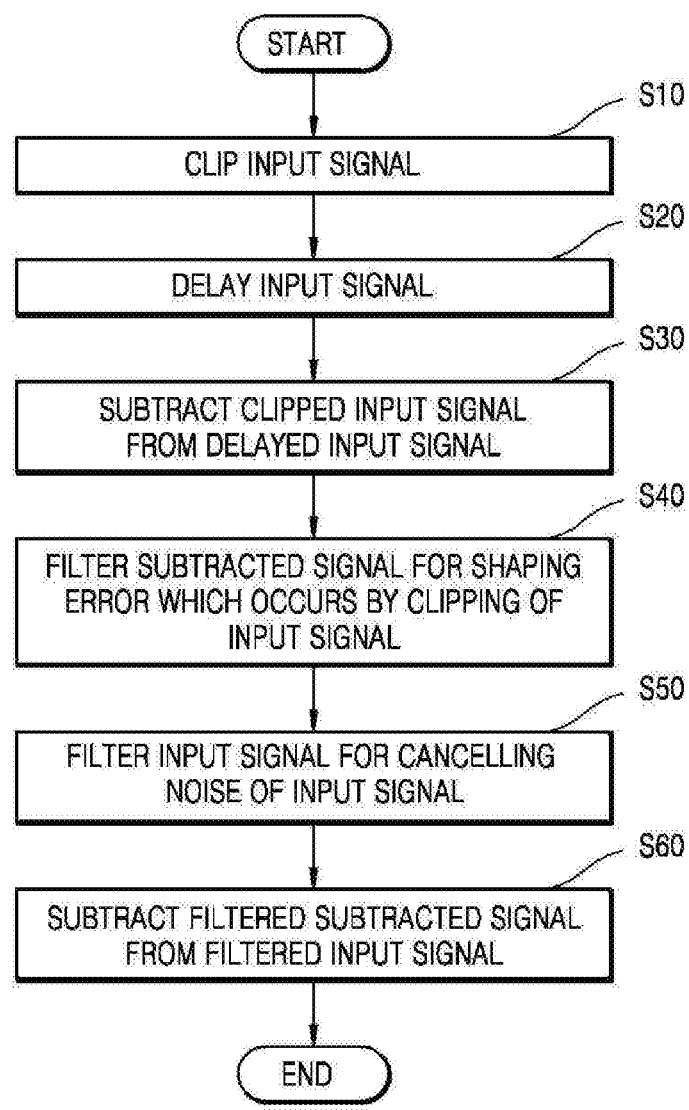
FIG. 4 is a flowchart for describing an operation of a crest factor reduction (CFR) core illustrated in FIG. 2.

FIG. 4 is a flowchart for describing an operation of a crest factor reduction (CFR) core illustrated in FIG. 2. It should also be noted that in some alternative implementations, the functions noted in the blocks may occur out of the order described in the present disclosure. For example, at least two blocks shown in succession may in fact be executed substantially concurrently or the blocks may sometimes be executed in the reverse order, depending upon the functionality involved. In more detail, step S10 and step S20 are executed substantially concurrently, or steps from S10 to S40 and step S40 are executed substantially concurrently.

Referring to FIGS. 1 to 4, the clipper 41 clips the input signal DIG_SIN input into the CFR core 40 (S10).

The delay unit 43 delays the input signal DIG_SIN input into the CFR core 40 (S20).

The first subtractor 45 subtracts the clipped input signal S_C output from the clipper 41 from the delayed input signal S_D output from the delay unit 43 (S30).

The error shaping filter 47 filters the subtraction signal S_S1 output by the first subtractor 45 (S40).

The digital filter 49 filters the input signal DIG_SIN input into the CFR core 40 for cancelling the noise of the input signal DIG_SIN input into the CFR core 40. The digital filter 49 is used instead of means for delaying, and as a result, the delay time of the repeater 100 may be minimized while reducing the PAPR.

The second subtractor 51 subtracts the filtered subtraction signal S_ES output from the error shaping filter 47 from the filtered input signal S_DF output from the digital filter to output the digital output signal DIG_SOUT (S60).

Although the exemplary embodiments of the inventive concept have been described with reference to the accompanying drawings as described above, those skilled in the art will be able to understand that the inventive concept can be implemented in other detailed forms without changing an essential characteristic. Therefore, it should be appreciated that the exemplary embodiments described above are exemplificative in all aspects and not limitative.

What is claimed is:

1. A crest factor reduction (CFR) core comprising:
   a clipper clipping an input signal;
   a delay unit delaying the input signal;
   a first subtractor subtracting the clipped input signal from the delayed input signal;
   an error shaping filter filtering the subtracted signal for shaping an error which occurs by the clipping of the input signal;
   a digital filter filtering the input signal for cancelling noise of the input signal; and
   a second subtractor subtracting the filtered subtracted signal from the filtered input signal.

2. The CFR core of claim 1, wherein a time required for filtering the input signal is substantially equivalent to an aggregation time of a time required for delaying the input signal, a time required for subtracting the clipped input signal from the delayed input signal, and a time required for filtering the subtracted signal.

3. The CFR core of claim 1, wherein the error shaping filter is a finite impulse response (FIR) filter.

4. The CFR core of claim 1, wherein the digital filter is the finite impulse response (FIR) filter.

5. A repeater comprising:
   a first antenna receiving a first analog signal;
   an analog to digital converter (ADC) converting the first analog signal into a first digital signal;
   a CFR core receiving the first digital signal and outputting the received first digital signal as a second digital signal having a reduced PAPR;
   a digital to analog converter (DAC) converting the second digital signal into a second analog signal; and
   a second antenna transmitting the second analog signal, wherein the CFR core includes
   a clipper clipping the first digital signal;
   a delay unit delaying the first digital signal;
   a first subtractor subtracting the clipped first digital signal from the delayed first digital signal;
   an error shaping filter filtering the subtracted signal for shaping an error which occurs by the clipping of the first digital signal;
   a digital filter filtering the first digital signal for cancelling noise of the first digital signal; and
   a second subtractor subtracting the filtered subtracted signal from the filtered first digital signal.

6. The repeater of claim 5, wherein a time required for filtering the first digital signal is substantially equivalent to an aggregation time of a time required for delaying the first digital signal, a time required for subtracting the clipped first digital signal from the first digital signal, and a time required for filtering the subtracted signal.

7. The repeater of claim 5, wherein the error shaping filter is an FIR filter.

8. A method for reducing a PAPR, the method comprising:
  clipping an input signal;
  delaying the input signal;
  subtracting the clipped input signal from the delayed input signal;
  filtering the subtracted signal for shaping an error which occurs by the clipping of the input signal;
  filtering the input signal for cancelling noise of the input signal; and
  subtracting the filtered subtracted signal from the filtered input signal.

9. The method of claim 8, wherein a time required for filtering the input signal is substantially equivalent to an aggregation time of a time required for delaying the input signal, a time required for subtracting the clipped input signal from the delayed input signal, and a time required for filtering the subtracted signal.

10. The method of claim 8, wherein a level of the clipped input signal is a threshold value or less.

* * * * *